(12) United States Patent
Nishida et al.

(10) Patent No.: US 9,656,363 B2
(45) Date of Patent: May 23, 2017

(54) VERTICAL MACHINING CENTER

(71) Applicant: Yamazaki Mazak Corporation, Niwa-gun (JP)

(72) Inventors: Kiyoshi Nishida, Niwa-gun (JP); Kazuhiro Noda, Niwa-gun (JP); Takehiro Toyoda, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 15/045,254

(22) Filed: Feb. 17, 2016

(65) Prior Publication Data

US 2016/0158906 A1    Jun. 9, 2016

Related U.S. Application Data

(63) Continuation of application No. PCT/JP2013/074925, filed on Sep. 13, 2013.

(51) Int. Cl.
*B23Q 11/08* (2006.01)
*B23Q 1/54* (2006.01)
(Continued)

(52) U.S. Cl.
CPC ............ *B23Q 11/0891* (2013.01); *B23C 1/06* (2013.01); *B23C 1/14* (2013.01); *B23Q 1/015* (2013.01);
(Continued)

(58) Field of Classification Search
CPC ... Y10T 409/305824; Y10T 409/30896; Y10T 408/545; Y10T 409/30392;
(Continued)

(56) References Cited

U.S. PATENT DOCUMENTS 3,998,127 A * 12/1976 Romeu ................ B23C 1/14
                                                  409/224
4,529,342 A *  7/1985 Babel .................. B23Q 5/00
                                                  409/224
(Continued)

FOREIGN PATENT DOCUMENTS

DE        3730984 C1 * 11/1988 ........... B23Q 1/0045
DE    10049810 A1 *  4/2002
(Continued)

OTHER PUBLICATIONS

Extended European Search Report for corresponding EP Application No. 13893610.9-1702, Sep. 30, 2016.
(Continued)

*Primary Examiner* — Erica E Cadugan
(74) *Attorney, Agent, or Firm* — Mori & Ward, LLP

(57) ABSTRACT

A vertical machining center includes a base; a tilting rotary table, a tool spindle, a tilting shaft, a recessed area, a slide door, and an inner cover. The tilting rotary table is disposed on the base and configured to turn and tilt a table face of a rotary table. The tool spindle is rotatable about a vertical axis line and movable in an X axis direction, a Y axis direction, and a Z axis direction. The tilting shaft is disposed in the tilting rotary table and oriented in the Y axis direction. The recessed area is disposed on a front surface of the vertical machining center. The recessed area is adjacent to a support supporting the tilting shaft. The slide door is configured to cover the front surface. The inner cover is integral with the slide door. The inner cover is configured to cover the recessed area.

22 Claims, 20 Drawing Sheets

(51) Int. Cl.
  B23Q 1/01 (2006.01)
  B23C 1/06 (2006.01)
  B23C 1/14 (2006.01)
  *B23Q 3/157* (2006.01)
  *B23Q 1/00* (2006.01)
  *B23C 1/00* (2006.01)

(52) U.S. Cl.
  CPC ......... *B23Q 1/5406* (2013.01); *B23Q 1/5437* (2013.01); *B23C 1/002* (2013.01); *B23Q 1/0045* (2013.01); *B23Q 1/012* (2013.01); *B23Q 3/15706* (2013.01); *B23Q 3/15766* (2013.01); *B23Q 2220/004* (2013.01); *Y10T 409/30392* (2015.01); *Y10T 409/305824* (2015.01); *Y10T 409/308288* (2015.01); *Y10T 483/115* (2015.01); *Y10T 483/1795* (2015.01)

(58) Field of Classification Search
  CPC . Y10T 74/219–74/2199; B23Q 1/5437; B23Q 1/5406; B23Q 1/5443; B23Q 1/5412; B23Q 1/5418; B23Q 1/5425; B23Q 1/5431; B23Q 2220/004; B23Q 11/08–11/0891; B23C 1/14
  USPC ..... 409/168, 224, 134; 408/71; 74/608–617; 451/451–457
  See application file for complete search history.

(56) References Cited

U.S. PATENT DOCUMENTS

| | | | |
|---|---|---|---|
| 5,342,156 A | 8/1994 | Baba | |
| 6,298,531 B1* | 10/2001 | Baumbusch | B23Q 1/015 29/36 |
| 6,394,892 B2* | 5/2002 | Hanisch | B23Q 1/52 451/177 |
| 2001/0015117 A1 | 8/2001 | Hoppe | |
| 2004/0049902 A1* | 3/2004 | Hagstrom | B23Q 1/5406 29/26 A |
| 2004/0111850 A1 | 6/2004 | Iwabuchi et al. | |
| 2006/0270540 A1 | 11/2006 | Takayama et al. | |
| 2007/0251071 A1 | 11/2007 | Ota | |
| 2008/0047120 A1* | 2/2008 | Soroka | B23Q 1/01 409/168 |
| 2008/0175684 A1* | 7/2008 | Schmidt | B23Q 1/012 409/212 |

FOREIGN PATENT DOCUMENTS

| | | | |
|---|---|---|---|
| FR | 2407040 A1 * | 5/1979 | .......... B23Q 1/5437 |
| JP | 02-009545 | 1/1990 | |
| JP | 04-360746 | 12/1992 | |
| JP | 05-293739 | 11/1993 | |
| JP | 06-027028 U | 4/1994 | |
| JP | 2001-252837 | 9/2001 | |
| JP | 2003-291050 | 10/2003 | |
| JP | 2007-296613 | 11/2007 | |
| JP | 2009-297821 A * | 12/2009 | |
| JP | 2010-228045 | 10/2010 | |
| KR | 100971168 B1 * | 7/2010 | .......... B23Q 1/5406 |

OTHER PUBLICATIONS

International Search Report for corresponding International Application No. PCT/JP2013/074925, Oct. 15, 2013.

* cited by examiner

VERTICAL MACHINING CENTER

CROSS-REFERENCE TO RELATED APPLICATIONS

The present application is a continuation application of International Application No. PCT/JP2013/074925, filed Sep. 13, 2013. The contents of this application are incorporated herein by reference in their entirety.

BACKGROUND OF THE INVENTION

Field of the Invention

The present invention relates to a vertical machining center.

Discussion of the Background

Vertical machining centers including a tilting rotary table are capable of five-axis machining on a workpiece placed on the table, and thus capable of machining a workpiece of a complicated shape. The vertical machining centers are capable of, at one set-up, machining all the surfaces of the workpiece excluding the surface to be mounted to the table, and thus ensure high machining efficiency.

A tilting shaft for rotating to tilt the rotary table has three types of support structure, such as a double-support single-drive type, a double-support double-drive type, and a single-support single-drive type.

The tilting shaft is disposed in a right-left direction as seen from the front of the machine (that is, A axis direction) or in a front-rear direction of the machine (that is, B axis direction).

In a machine with the tilting shaft disposed in the A axis direction, when the table is tilted toward the other side of the front surface of the machine, an operator standing in front of the machine has difficulty in visually checking the portion that is being machined. The machine, however, can employ a tilting shaft support structure of any type.

Meanwhile, in a machine with the tilting shaft disposed in the B axis direction, when the table is tilted toward the left or the right, the operator standing in front of the machine can easily visually check the portion that is being machined. Unfortunately, in the tilting shaft support structure of the double-support type, the tilting shaft support member obstructs the operator working in front of the machine.

In view of workability and visibility for the operator in front of the machine, Japanese Unexamined Patent Application Publication No. 2007-296613 discloses an exemplary machine tool wherein a tilting shaft of the single-support single-drive type is disposed in the B axis direction, in an attempt to maintain high accuracy.

SUMMARY OF THE INVENTION

According to one aspect of the present invention, a vertical machining center includes a base, a tilting rotary table, a tool spindle, a tilting shaft, a recessed area, a slide door, and an inner cover. The tilting rotary table is disposed on the base. The tilting rotary table is configured to turn and tilt a table face of a rotary table. The tool spindle is rotatable about a vertical axis line. The tool spindle is movable in an X axis direction, which is a right-left direction of the vertical machining center, in a Y axis direction, which is a front-rear direction of the vertical machining center, and in a Z axis direction, which is vertical direction. The X axis direction, the Y axis direction, and the Z axis direction is orthogonal to each other. The tilting shaft is disposed in the tilting rotary table. The tilting shaft is oriented in the Y axis direction. The recessed area is disposed on a front surface of the vertical machining center. The recessed area is adjacent to a support supporting the tilting shaft. The slide door is configured to cover the front surface of the vertical machining center in a manner that is openable and closable. The inner cover is integral with the slide door. The inner cover is configured to cover the recessed area.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
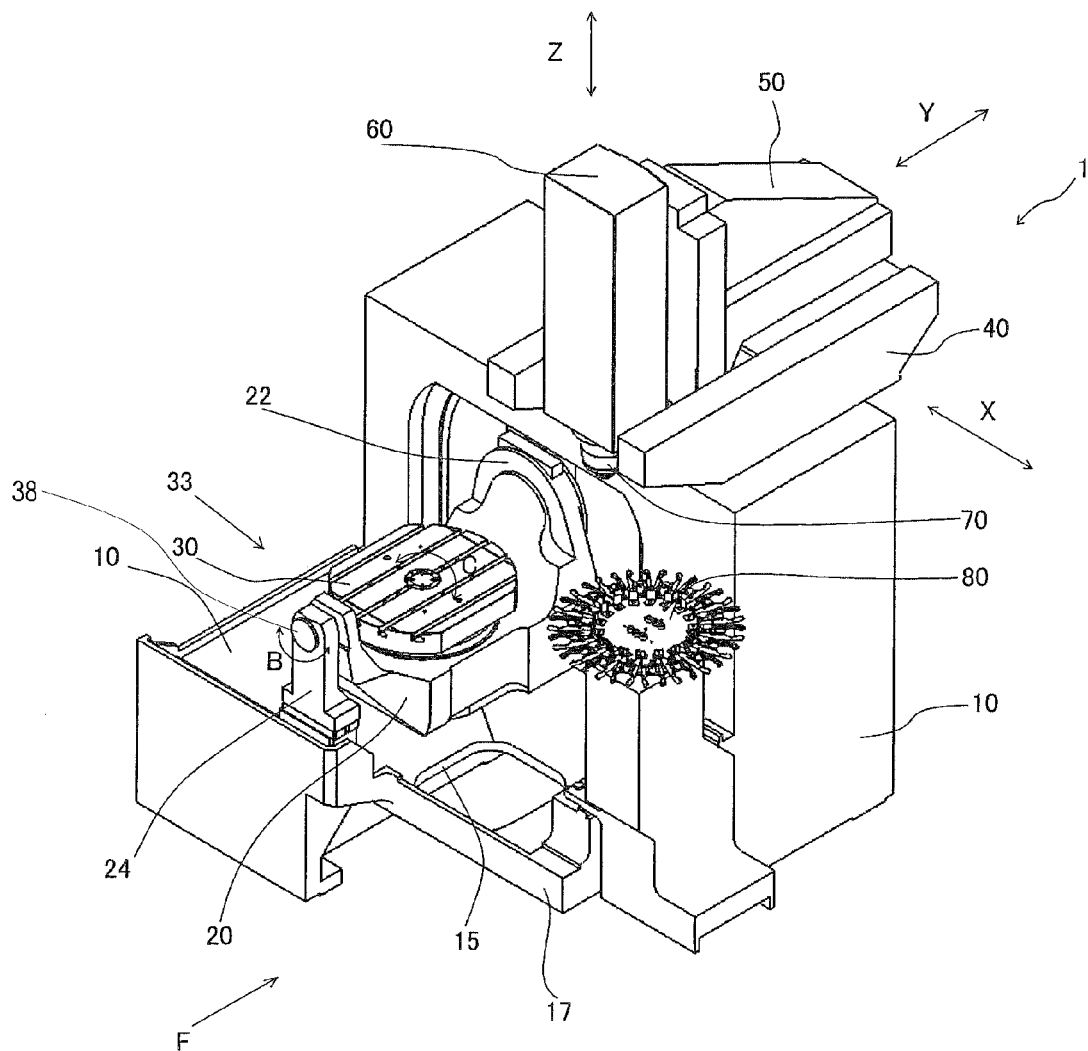
FIG. 1 is a perspective view of a configuration of a vertical machining center according to embodiments.

The embodiments will now be described with reference to the accompanying drawings, wherein like reference numerals designate corresponding or identical elements throughout the various drawings.

Figure 2:
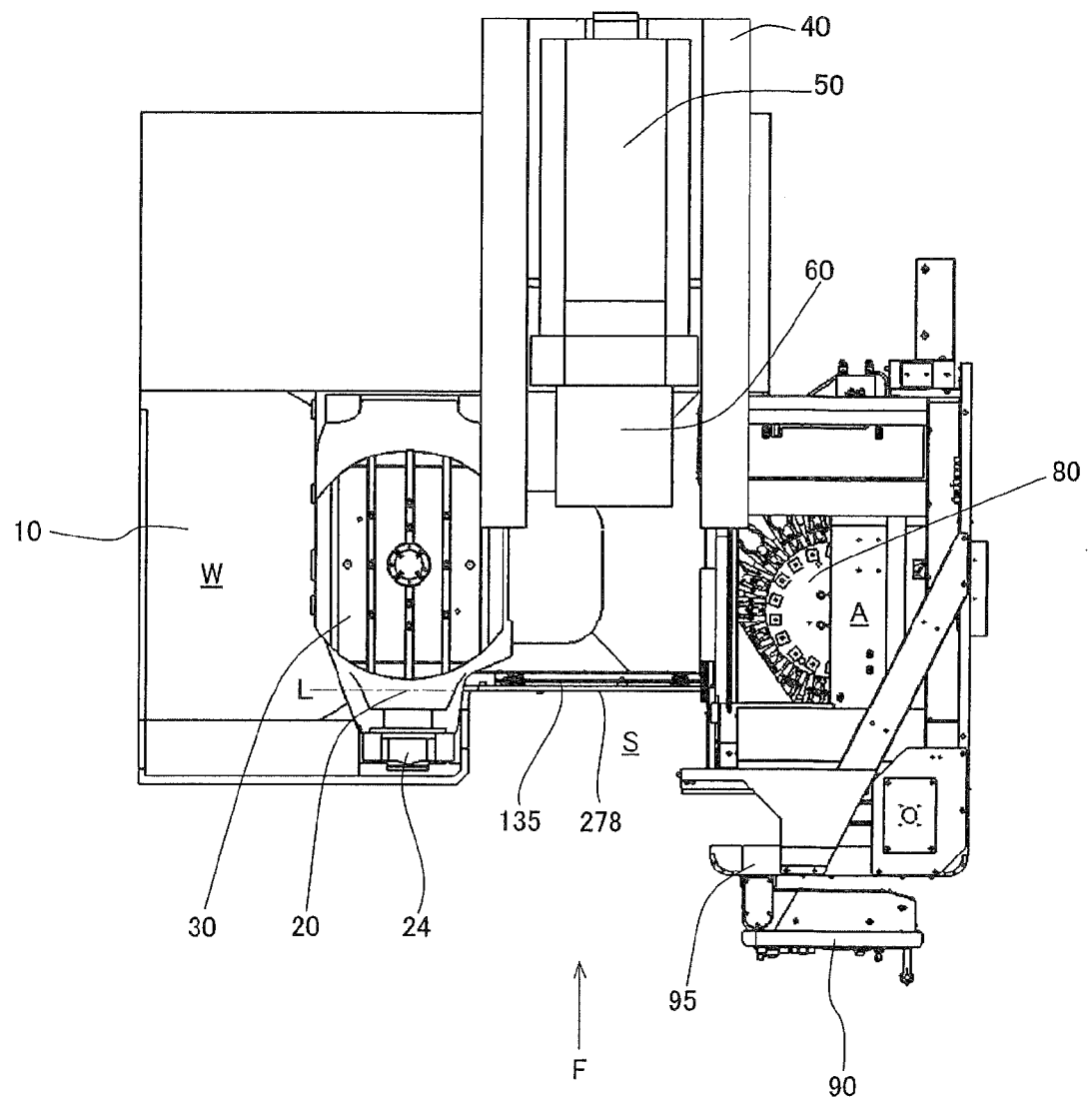
FIG. 2 is a plan view of the vertical machining center according to the embodiments.

FIG. 1 is a perspective view of a unit configuration of a vertical machining center according to the embodiments, and FIG. 2 is a plan view of the vertical machining center in which a metal plate is partially added.

A vertical machining center 1 includes a base 10. The base 10 supports the entire machine. On the base 10, an X axis moving unit 40 is disposed. The X axis moving unit 40 moves in an X axis direction, which is the right-left direction as seen from the front side F of the machine.

On the X axis moving unit 40, a Y axis moving unit 50 is disposed. The Y axis moving unit 50 moves in a Y axis direction, which is the front-rear direction as seen from the front side F of the machine.

On the Y axis moving unit 50, a Z axis moving unit 60 is disposed. The Z axis moving unit 60 moves in a Z axis direction, which is a vertical direction, and supports a tool spindle 70, which rotates about a vertical axis line.

On the front portion of the base 10, a tilting frame 20 is disposed.

The tilting frame 20 is supported turnably about a B axis, which is parallel to the Y axis, by a B axis driving device 22 and a support 24. The B axis driving device 22 is disposed inside of a hollow portion of the base 10. The support 24 is disposed on the front portion of the base 10.

On the tilting frame 20, a rotary table 30 is disposed. The rotary table 30 rotates about a C axis, which is parallel to the Z axis. The tilting frame 20 and the rotary table 30 constitute a tilting rotary table 33.

On the rotary table 30, a workpiece is to be mounted.

With the configuration above, the workpiece is moved about the B axis direction and the C axis direction by the tilting rotary table 33, and is subjected to cutting by rotating a tool $T_1$ about a tool axis line. The tool $T_1$ is mounted to the tool spindle 70, which is driven in the X axis, Y axis, and Z axis directions.

Figure 14:
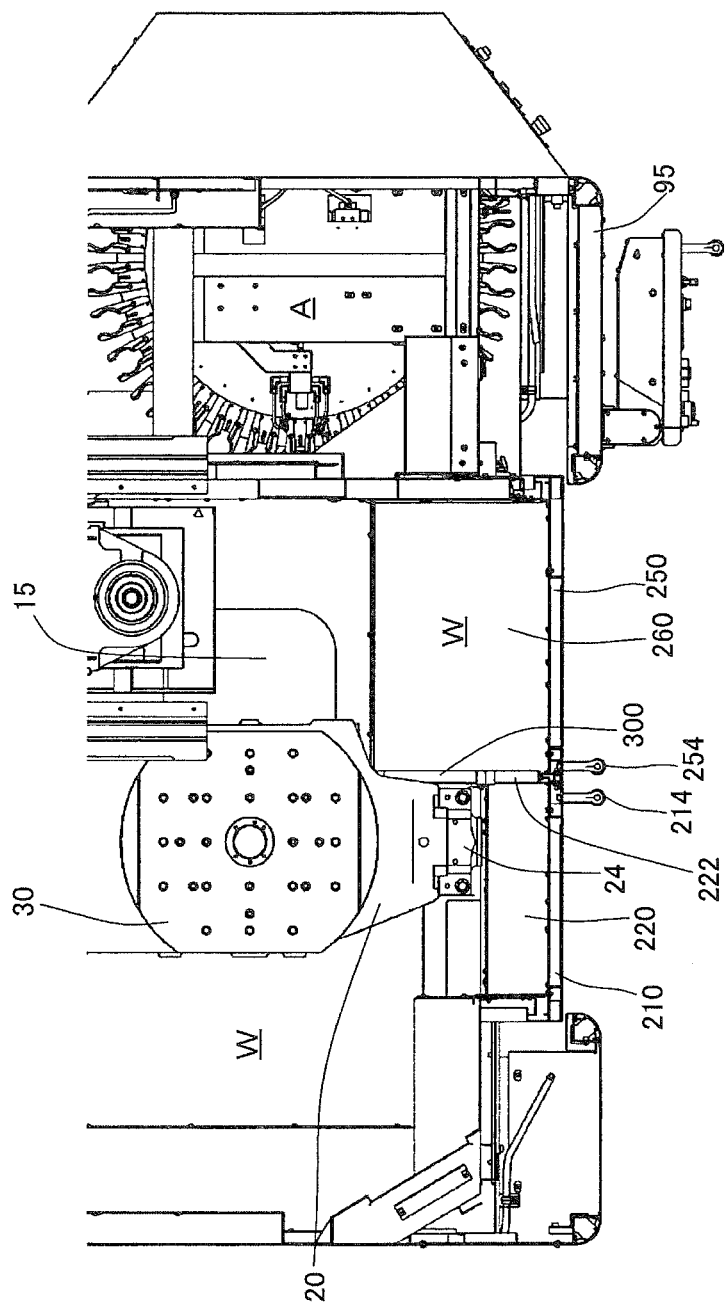
FIG. 14 is a plan view of the main elements of the vertical machining center including two doors, in which the doors are closed.

As shown in FIG. 2, the base 10 includes a machining area W and a tool replacing area A. A work area is provided for an operator to work on a workpiece on the rotary table 30 or on a tool mounted to the tool spindle 70. One side of the front portion of the tilting frame 20, on which the rotary table 30 is mounted, is concaved, and a portion of the base 10 adjacent to the support 24 is concaved inwardly. The resulting area is used as the work area. This area functions as a work area (recessed area) S when a door 100, 250, or 450 covering the front surface of the machine is closed. When the door is closed as shown in FIG. 14, the top of the work area (recessed area) S is completely covered by the door, and it functions as a machining area W.

The tilting shaft support structure is of the double-support single-drive type. Specifically, the B axis driving device 22, which supports and drives the tilting shaft 38, is disposed inside of a hollow portion formed in the base 10 to ensure rigidity. This structure minimizes the dimension of the shaft support on the other side, that is, the support 24.

In the machining area W, the rotary table 30 and the tool spindle 70 are disposed. The rotary table 30 is supported by the tilting frame 20, and the tool spindle 70 is supported by the Z axis moving unit 60. In the tool replacing area A, a tool magazine 80 is disposed.

An operation panel 90 is turnably mounted to an end of a fixed cover 95. The end of a fixed cover 95 is adjacent to the work area (recessed area) S. The fixed cover 95 is disposed on the front surface of the vertical machining center. The operation panel 90 turns to be fixed at any position between positions parallel and orthogonal to the fixed cover 95.

The work area (recessed area) S is formed to have the distal end approximately on an extended line L of the front end of the rotary table.

Figure 3:
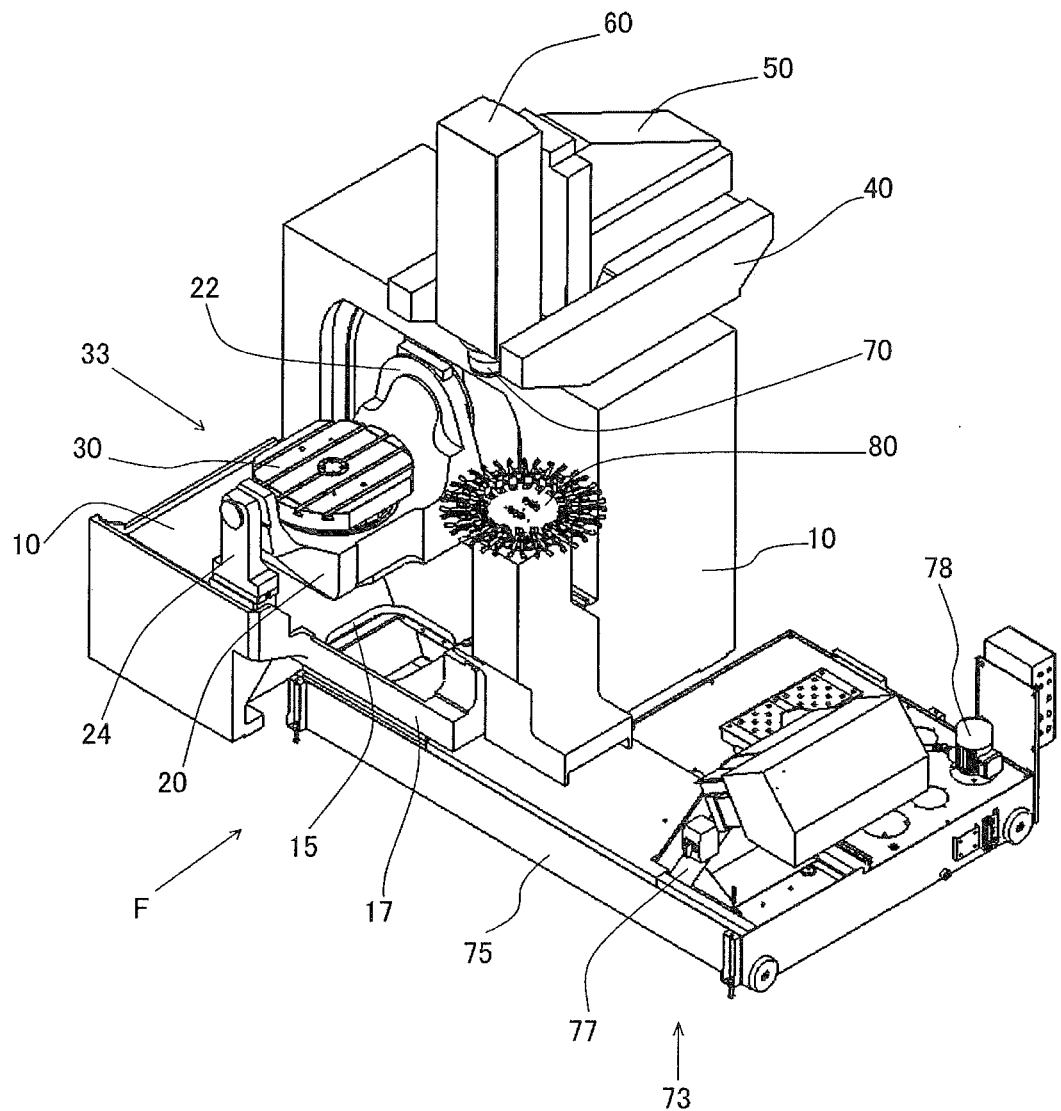
FIG. 3 is a perspective view of a vertical machining center including a chip disposal system.

FIG. 3 is a perspective view of the vertical machining center 1 with a chip disposal system 73 added.

The chip disposal system 73 includes a coolant tank 75, a chip conveyor 77, and a coolant pump 78.

The upper surface of the coolant tank 75 has an opening. The opening is disposed under a through-hole portion 15 of the base 10. The through-hole portion 15 is disposed under the rotary table 30 in the vertical machining center 1. Through the opening, the coolant tank 75 receives a coolant and chips resulting from cutting. The received chips are discharged to the outside of the machine by the chip conveyor 77, and the coolant is reused in the machine with the coolant pump 78.

Figure 4:
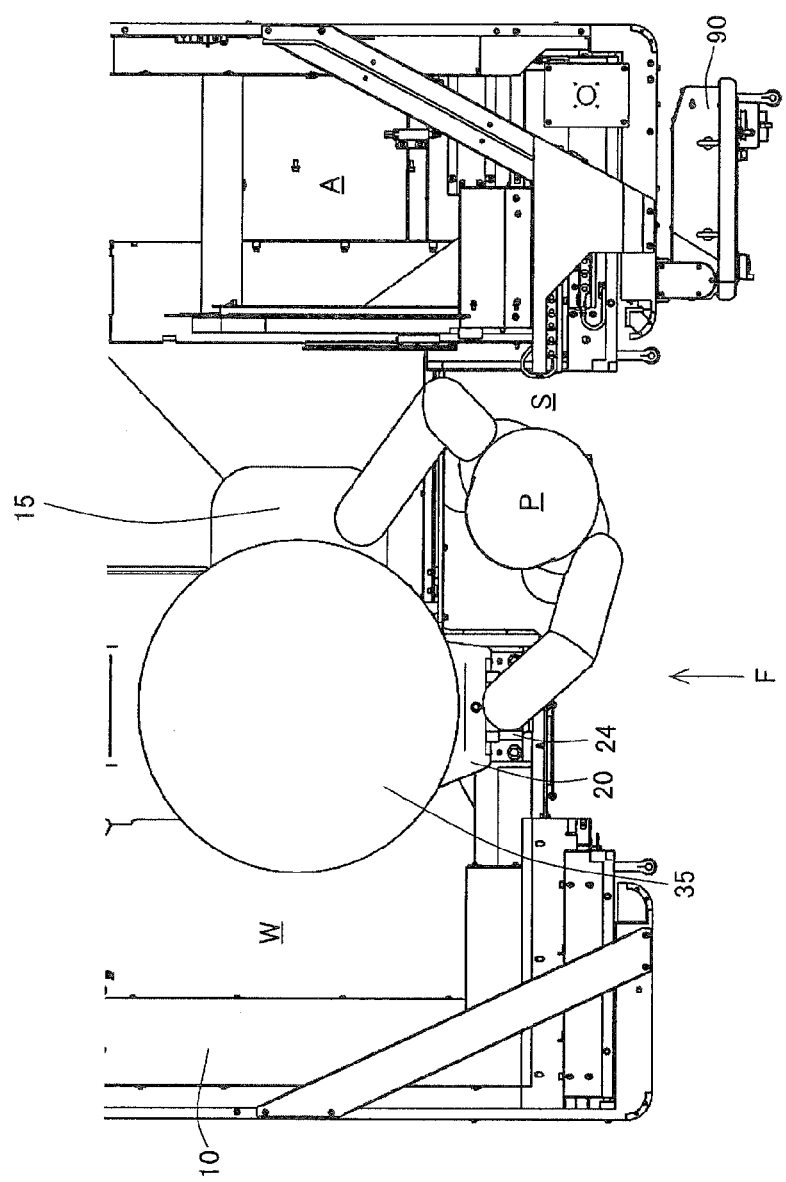
FIG. 4 is a plan view of main elements of the vertical machining center.

FIG. 4 is a diagram illustrating a state in which an operator P enters the work area (recessed area) S and accesses to the workpiece 35 disposed on the rotary table 30.

When the operator P enters the work area (recessed area) S, the support 24, which supports the tilting frame 20, is located on the left side of the operator P, instead of on the front side of the operator P. This ensures that the operator P properly faces the workpiece 35 on the rotary table 30 to work on the workpiece without hindrance.

Figure 5:
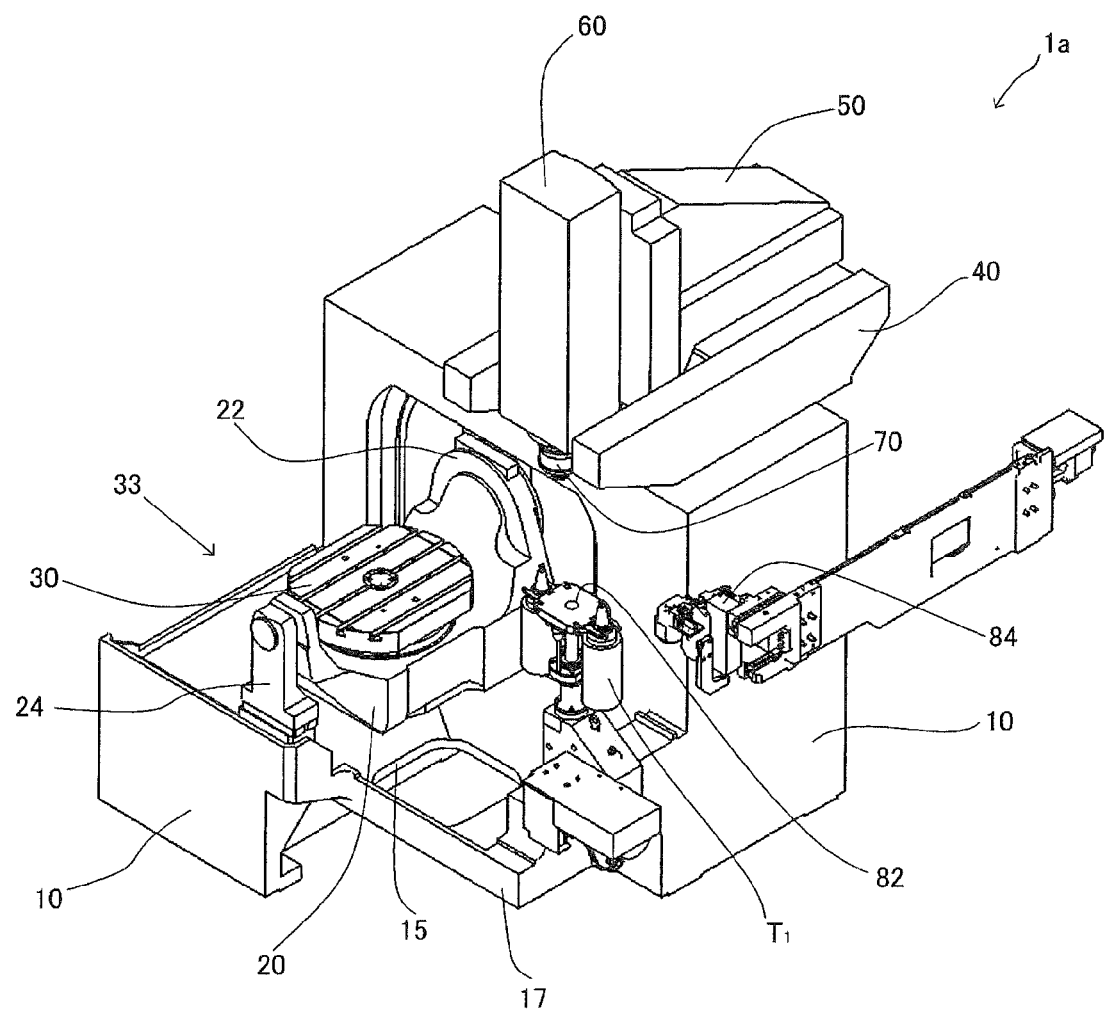
FIG. 5 is a perspective view of a configuration of a vertical machining center according to another embodiment.
Figure 6:
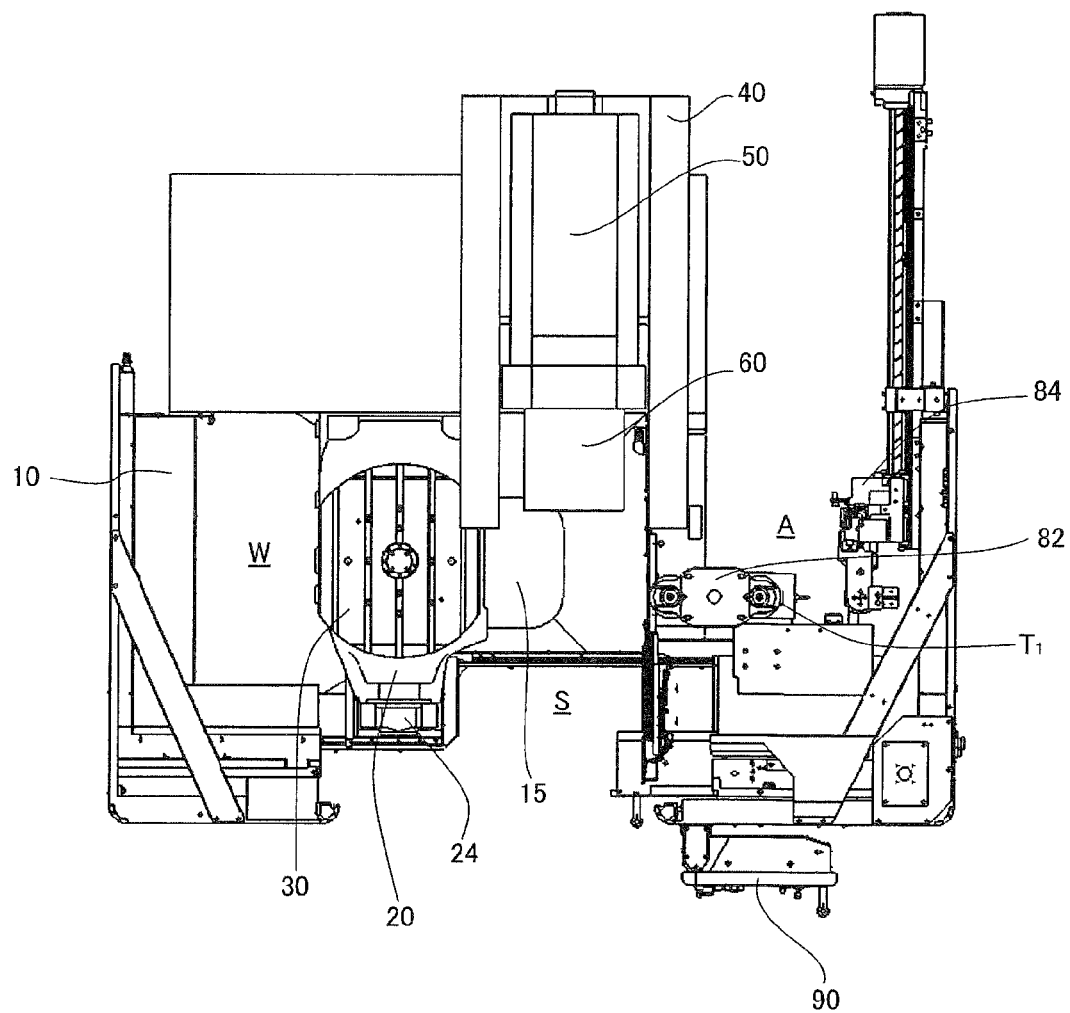
FIG. 6 is a plan view of a vertical machining center according to another embodiment.
Figure 7:
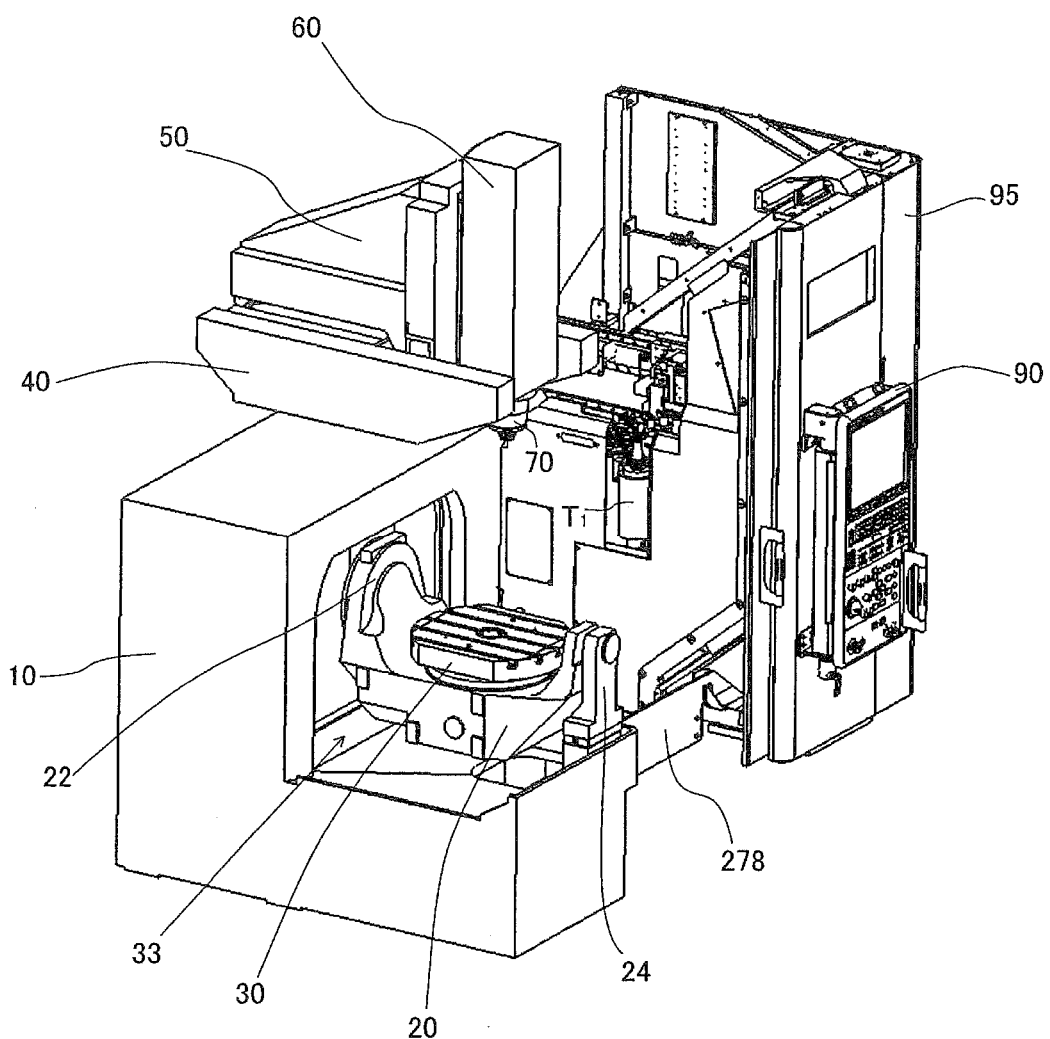
FIG. 7 is a perspective view of a vertical machining center according to another embodiment.

FIG. 5 is a perspective view of a configuration of the vertical machining center according to another embodiment. FIG. 6 is a plan view of the vertical machining center having a metal plate partially added. FIG. 7 is a perspective view, seen from an angle different from the angle in FIG. 5, of the vertical machining center having a metal plate partially added.

The vertical machining center 1a includes the tilting frame 20, the rotary table 30, the X axis moving unit 40, the Y axis moving unit 50, and the Z axis moving unit 60. These elements are disposed on the base 10, similarly to the configuration of the vertical machining center 1.

In the tool replacing area A, the vertical machining center 1a includes an arm 82 and a tool transfer device 84. The arm 82 replaces the tool $T_1$. As opposed to the vertical machining center 1, which includes the tool magazine 80 in the tool replacing area A, a large tool magazine, not shown, is disposed on the rear side of the machine. The vertical machining center 1a is otherwise similar to the vertical machining center 1. The vertical machining center 1a may include a chip disposal system.

Figure 8:
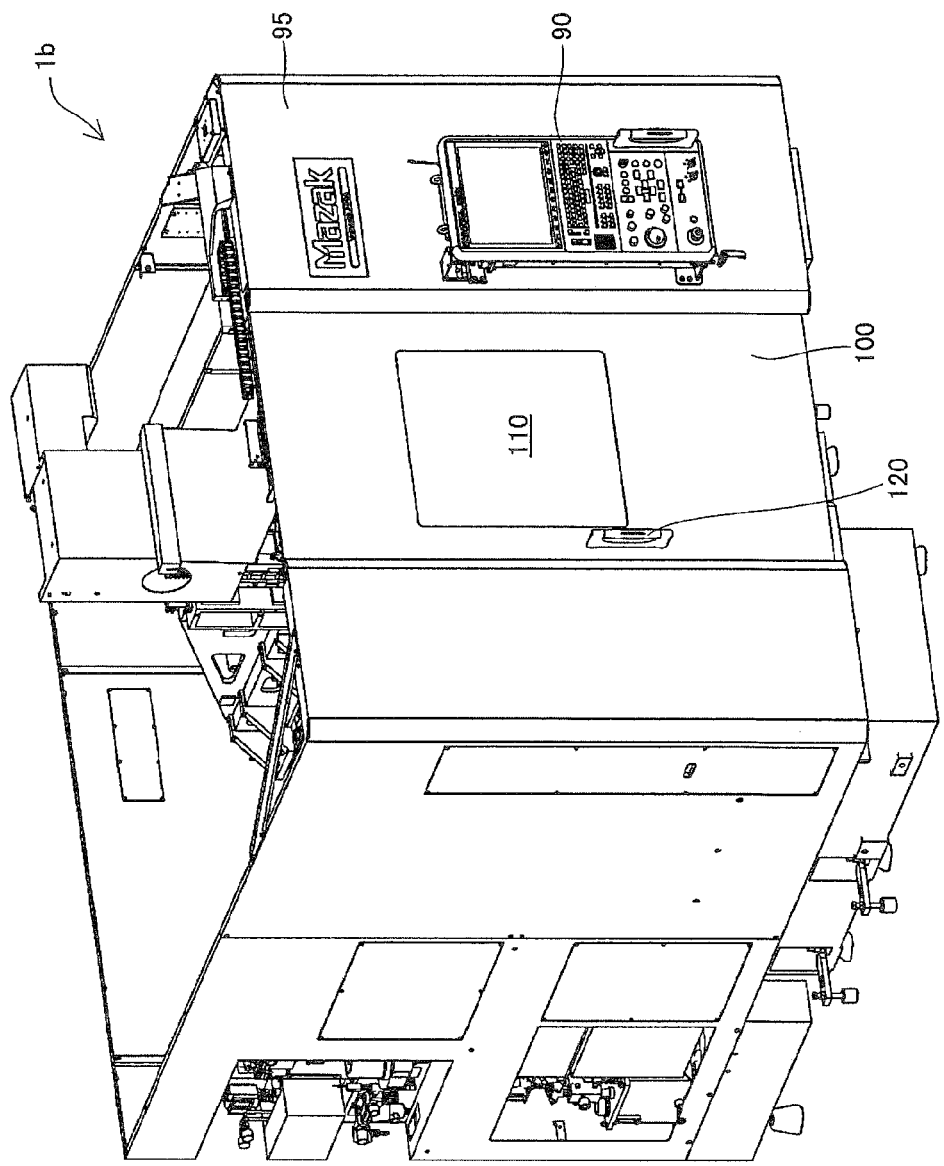
FIG. 8 is a perspective view of a vertical machining center including one door.
Figure 9:
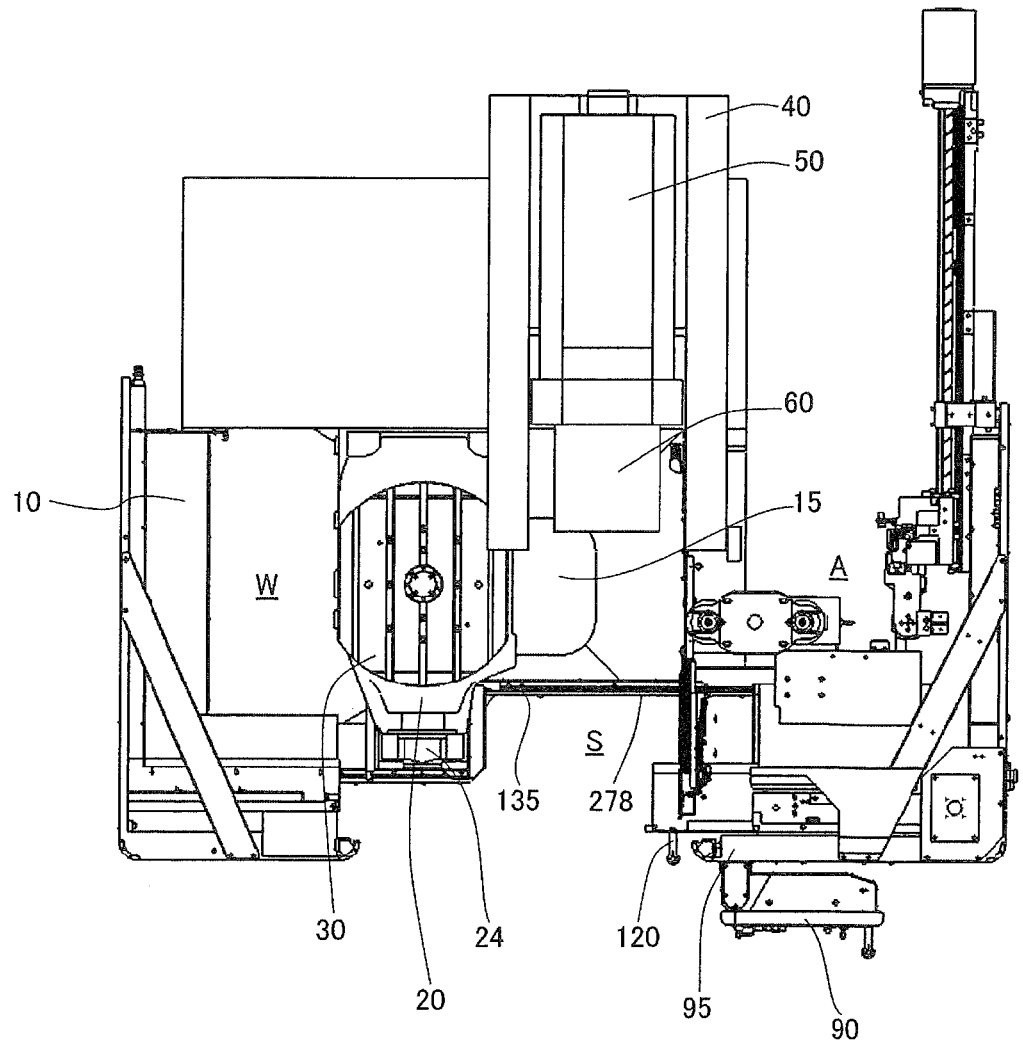
FIG. 9 is a plan view of the vertical machining center including one door.

FIG. 8 is a perspective view of a vertical machining center 1b, which includes a single door 100, and FIG. 9 is a plan view of the vertical machining center 1b.

The single door 100 includes a transparent window 110 through which the inside of the machine is monitored. The single door 100 includes a handle 120. The handle 120 is pulled to the right in the drawing to open the single door 100. When the single door 100 is opened, the single door 100 slides into the fixed cover 95 disposed on the front surface of the machine tool.

Figure 10:
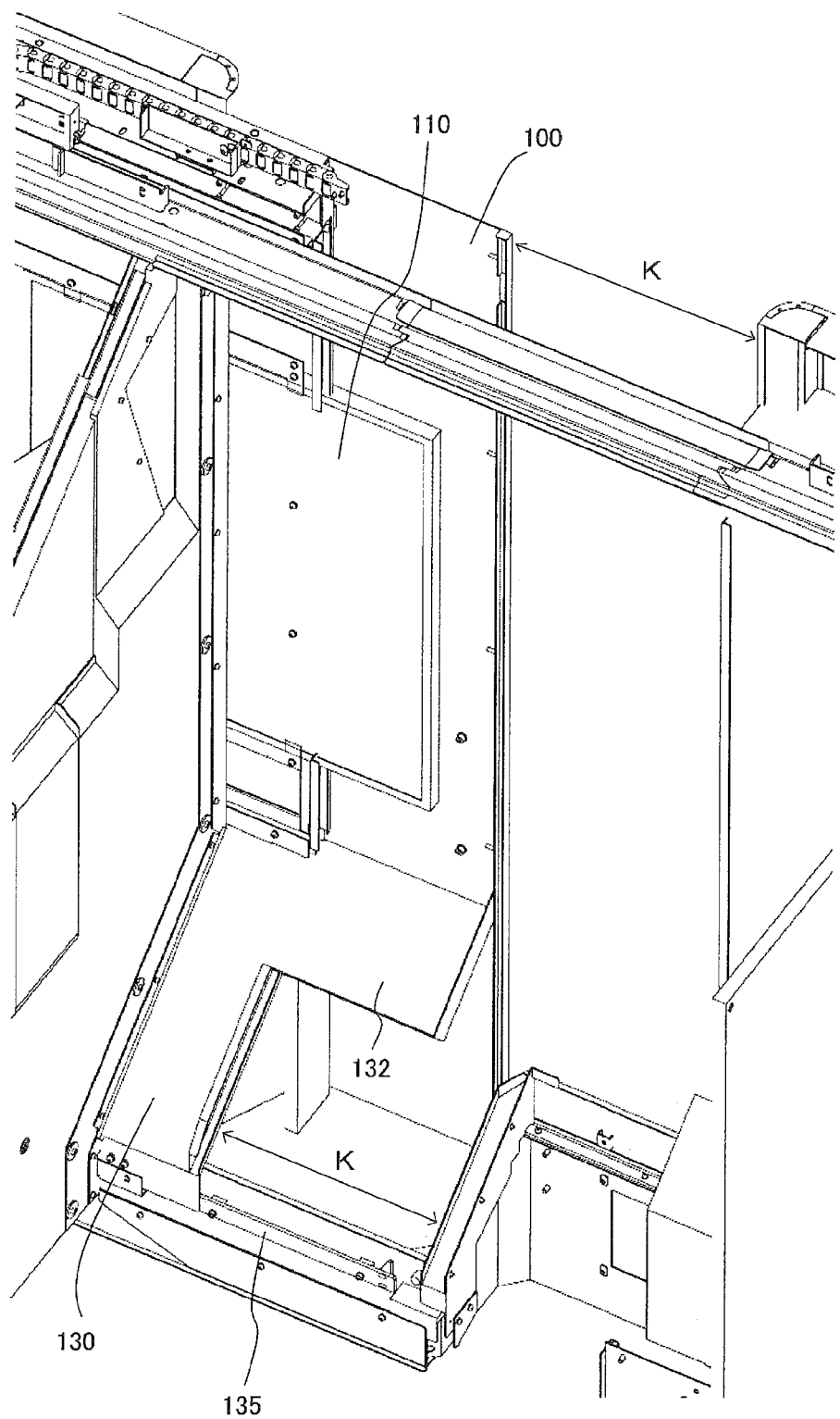
FIG. 10 is a perspective view of the rear surface of the one door.

FIG. 10 is a perspective view of the single door 100 seen from the rear side of the door. The single door 100 moves on a rail 135. In FIG. 10, the single door 100 is opened by a length K. The rail 135 is mounted on a rail-accepting metal plate 278. The rail-accepting metal plate 278 is mounted to the front surface 17 of the recessed area of the base 10. The recessed area defines the work area (recessed area) S (see FIG. 9).

The single door 100 includes an inner cover portion 130 having a long inclined surface covering the work area (recessed area) S and a coolant guiding portion 132 having a short inclined surface facing the support 24 when the door 100 is closed. The inner cover portion 130 and the coolant guiding portion 132 completely cover the space between the single door 100 and the base 10 including the recessed area S when the single door 100 is closed. The lower end of the inner cover portion 130 is engaged with the rail 135. The coolant and chips on the inner cover portion 130 drop to the inside of the recessed area of the base 10 to which the rail 135 is mounted, that is, into the through-hole portion 15.

As in the present embodiment, providing the single door 100 apart from the base 10 to cover the front surface of the machine results in another space to be defined between the base 10 and the single door 100 at a portion of the door facing the support 24 as well as the recessed area S. The coolant and the chips produced during the cutting drop between the single door 100 and the base 10. In view of this, the coolant guiding portion 132 is disposed at an inner portion of the single door 100. The coolant guiding portion 132 faces the support 24 when the single door 100 is closed, and guides the coolant and the chips to the base 10 when the coolant and the chips drop onto inner portions of the single door 100. In the case where the single door is disposed in a portion of the base 10 to which the support 24 is mounted, the coolant guiding portion 132 is unnecessary.

Figure 11:
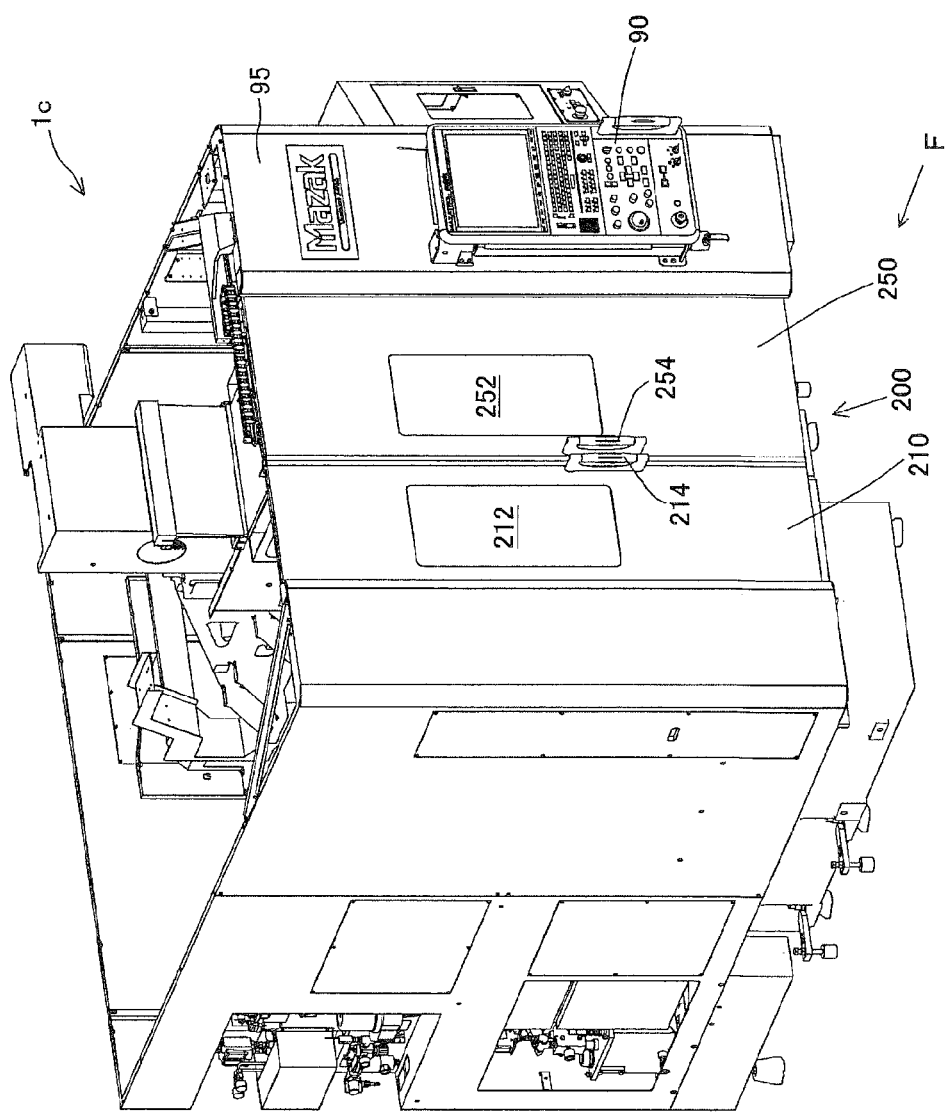
FIG. 11 is a perspective view of a vertical machining center including two doors.

FIG. 11 is a perspective view of a vertical machining center 1c, which includes two slide doors.

The double door 200 include a left door 210 and a right door 250.

The left door 210 includes a transparent window 212 and a handle 214. The left door 210 slides to the left to be opened as seen from a front side F of the vertical machining center.

The right door 250 includes a transparent window 252 and a handle 254. The right door 250 slides to the right to be opened. Similarly to the single door 100, the right door 250 slides into the fixed cover 95 disposed on the front surface of the vertical machining center.

Figure 12:
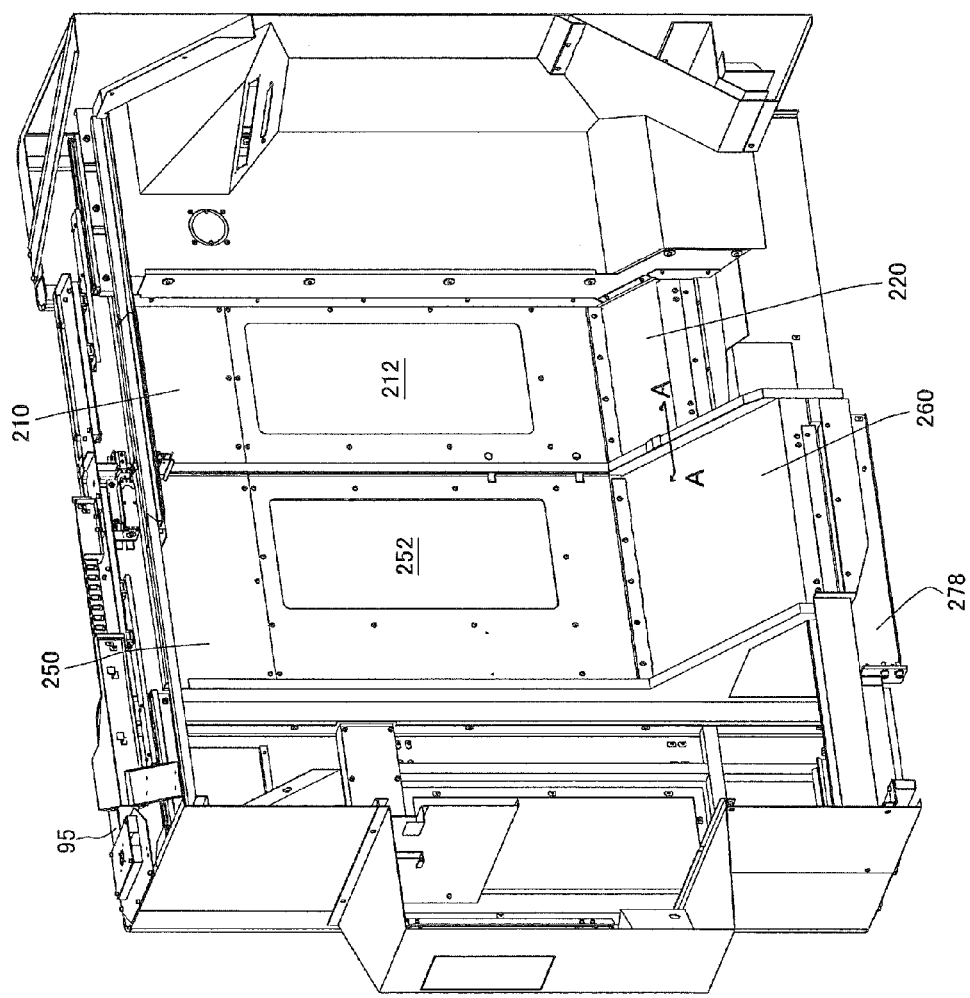
FIG. 12 is a perspective view of the rear surface of the two doors.

FIG. 12 is a perspective view of the two doors as seen from the rear side of the doors, in which a metal plate unit is disposed around the door. The metal plate unit is mounted on the base 10 with bolts at a plurality of positions of the base 10. The metal plate unit is mounted, at least, to the front surface 17 of the recessed area of the base 10 via the rail-accepting metal plate 278.

The left door 210 includes a coolant guiding plate 220 on the rear side of the left door. The coolant guiding plate 220 faces the support 24 when the left door 210 is closed. The right door 250 includes an inner cover 260 on the rear side of the right door. The inner cover 260 covers the work area (recessed area) S when the right door 250 is closed.

The left door 210 is spaced apart from the base 10, similarly to the case of the single door 100. Such a configuration causes an undesired situation in which the coolant and the chips drop into the space between the base 10 and the left door 210. To prevent this situation, the coolant guiding plate 220 is disposed to guide the coolant and the chips to the inside of the base 10 when the coolant and the chips drop onto the left door 210. When the left door is disposed on the base 10, the coolant guiding plate 220 is unnecessary.

Figure 13:
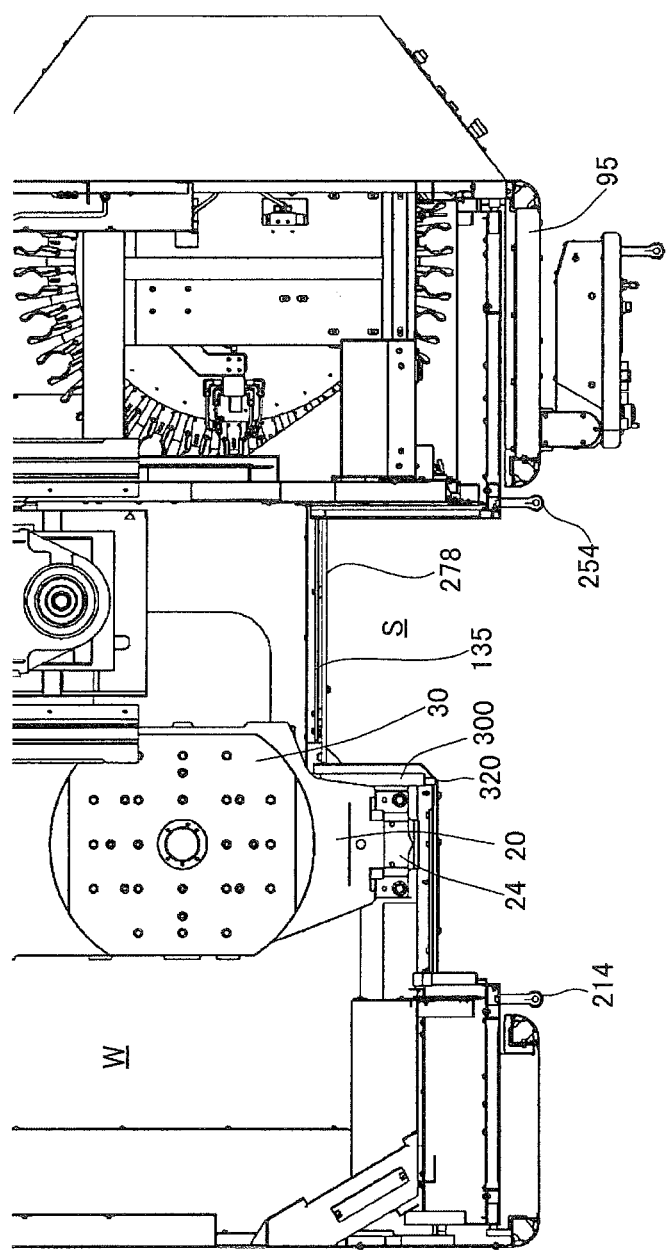
FIG. 13 is a plan view of main elements of the vertical machining center including two doors, in which the doors are open.

FIG. 13 a diagram illustrating a state in which the left door 210 and the right door 250 are opened. The machine includes a door meshing member 300 adjacent to the support 24, specifically adjacent to a boundary between the work area (recessed portion) S and the machining area W or an end of the work area (recessed portion) on the table side.

FIG. 14 is a diagram illustrating a state in which the left door 210 and the right door 250 are closed. The door meshing member 300 is sandwiched between the coolant guiding plate 220 of the left door 210 and the inner cover 260 of the right door 250. That is, the doors 210 and 250 open in left and right directions, respectively, with a part of the end of the work area (recessed portion) S adjacent to the table being the center of opening.

As shown in the diagram, the inner cover 260 covers the work area (recessed area) S. The chips and coolant produced during the machining are entirely collected in the chip disposal system 73 via the through-hole portion 15. This eliminates or minimizes the situation in which the chips and the coolant drop in the work area (recessed area) S.

Figure 15:
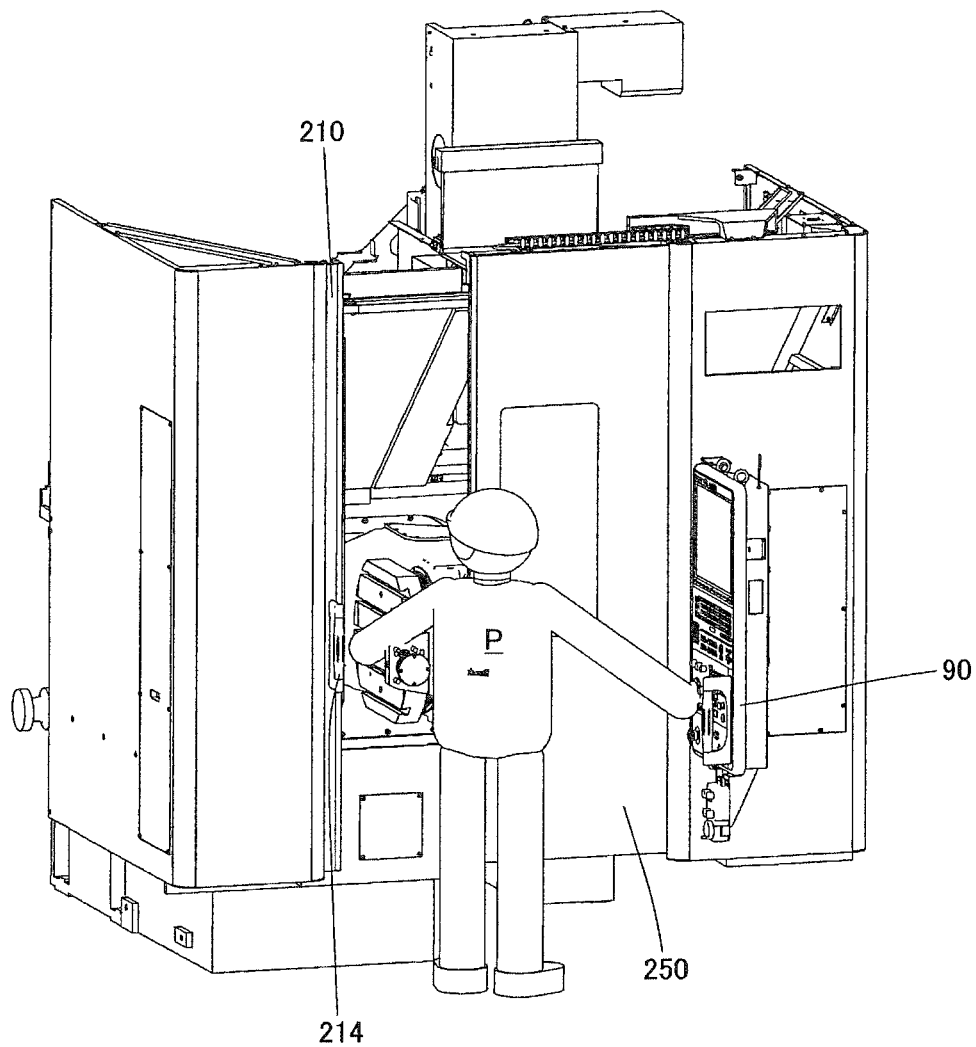
FIG. 15 is a diagram illustrating an operation of the vertical machining center including two doors.

FIG. 15 is a diagram illustrating a state in which the operator P slides the left door 210 to the left with the handle 214 to open it while keeping the right door 250 closed.

The operator P easily performs various kinds of work on the rotary table 30 and the workpiece placed on the rotary table 30, such as checking the machined surface and removing the chips, because the operator is significantly close to the workpiece especially when the rotary table 30 is tilted to the left. The operator P turns the operation panel 90 around to a position orthogonal to the fixed cover 95 and fixes the operation panel in place. This ensures that the operator P easily operates the switches on the operation panel. Additionally, the operation panel 90 at this position enables the operator P to move the workpiece about the B axis and the C axis to change the posture of the workpiece without stress.

Figure 16:
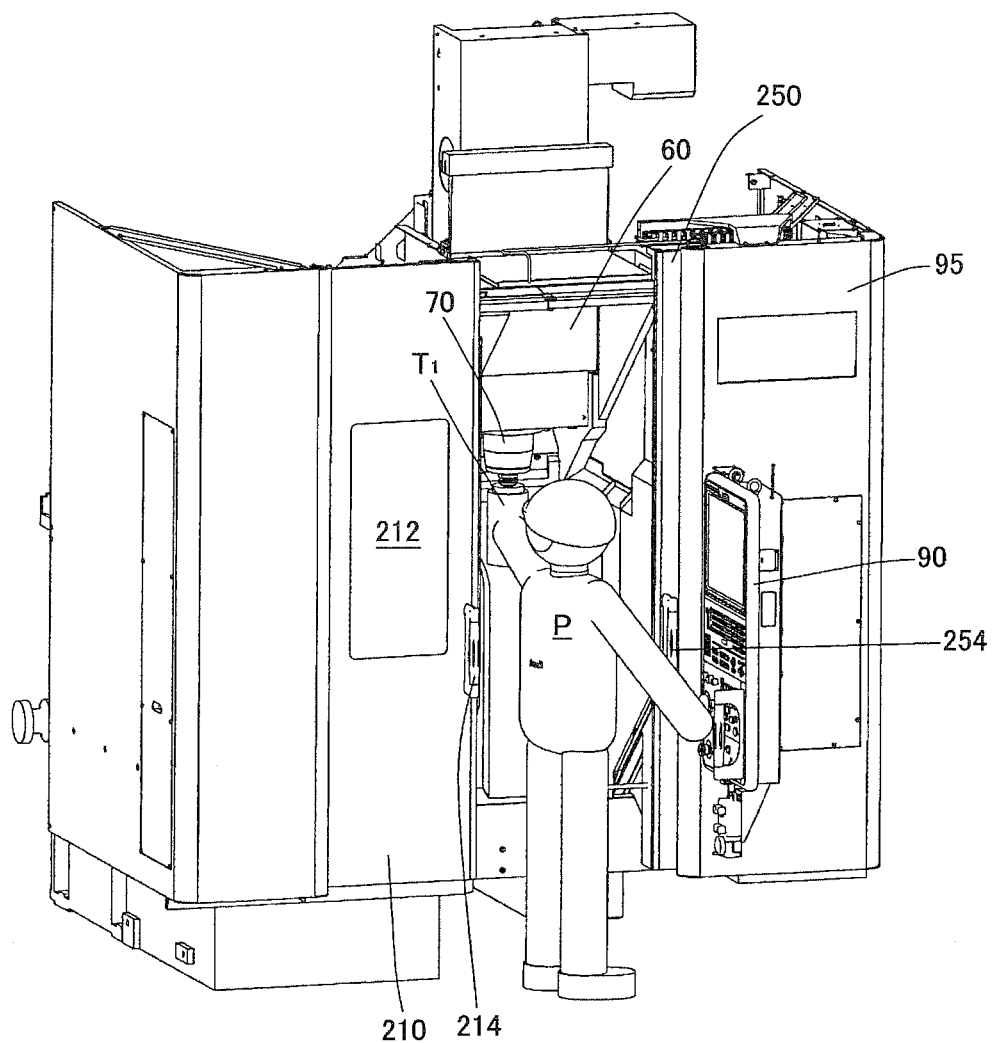
FIG. 16 is a diagram illustrating an operation of the vertical machining center including two doors.

FIG. 16 is a diagram illustrating a state in which the operator P slides the right door 250 to the right with the handle 254 while keeping the left door 210 closed.

The operator P easily performs various kinds of work on the workpiece placed on the rotary table 30, such as checking the machined surface and removing the chips, because the operator P is significantly close to the workpiece especially when the rotary table 30 is tilted to the right. When the operator P accesses to the tool $T_1$ mounted to the tool spindle 70, the operator P enters the work area (recessed area) S to reach the tool $T_1$ even when the tool spindle 70 is positioned at the Y axis origin position, that is, the stroke end of the Y axis on a positive side, that is, even when the tool $T_1$ is positioned at the farthest position from the operator P. The operator P works on the tool $T_1$ without having to move the Y axis toward the operator side. The operator turns the operation panel 90 around to a position orthogonal to the fixed cover 95 and fixes the operation panel in place. This ensures that the operator P easily operates the switches on the operation panel to change the posture of the workpiece or work the tool without stress.

Figure 17:
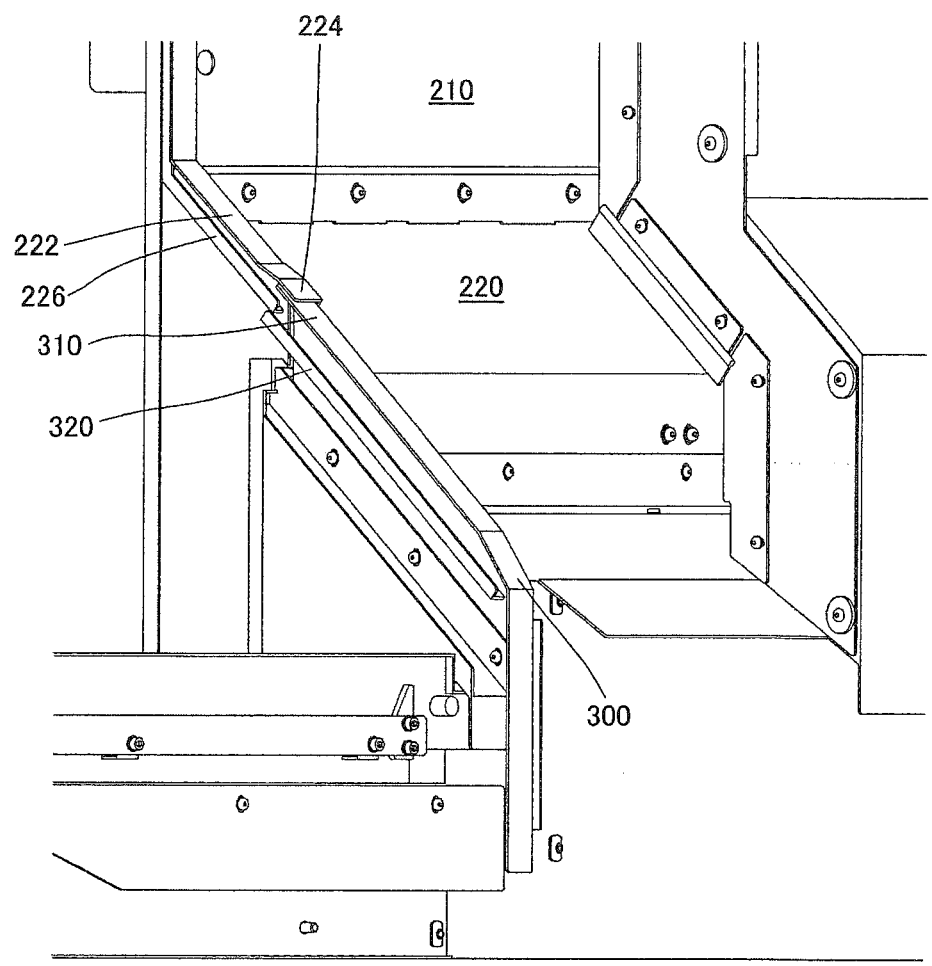
FIG. 17 is a perspective view of a relation between the two doors and a door meshing member.
Figure 18:
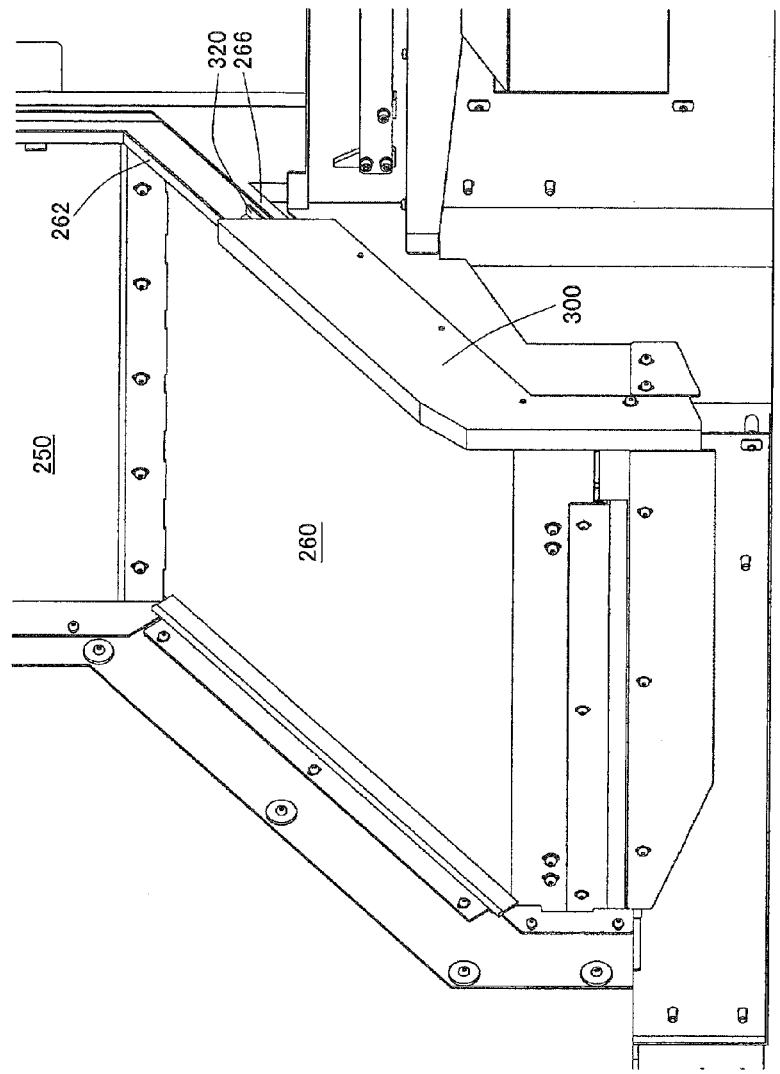
FIG. 18 is a perspective view of relationship between the two doors and the door meshing member.
Figure 19:
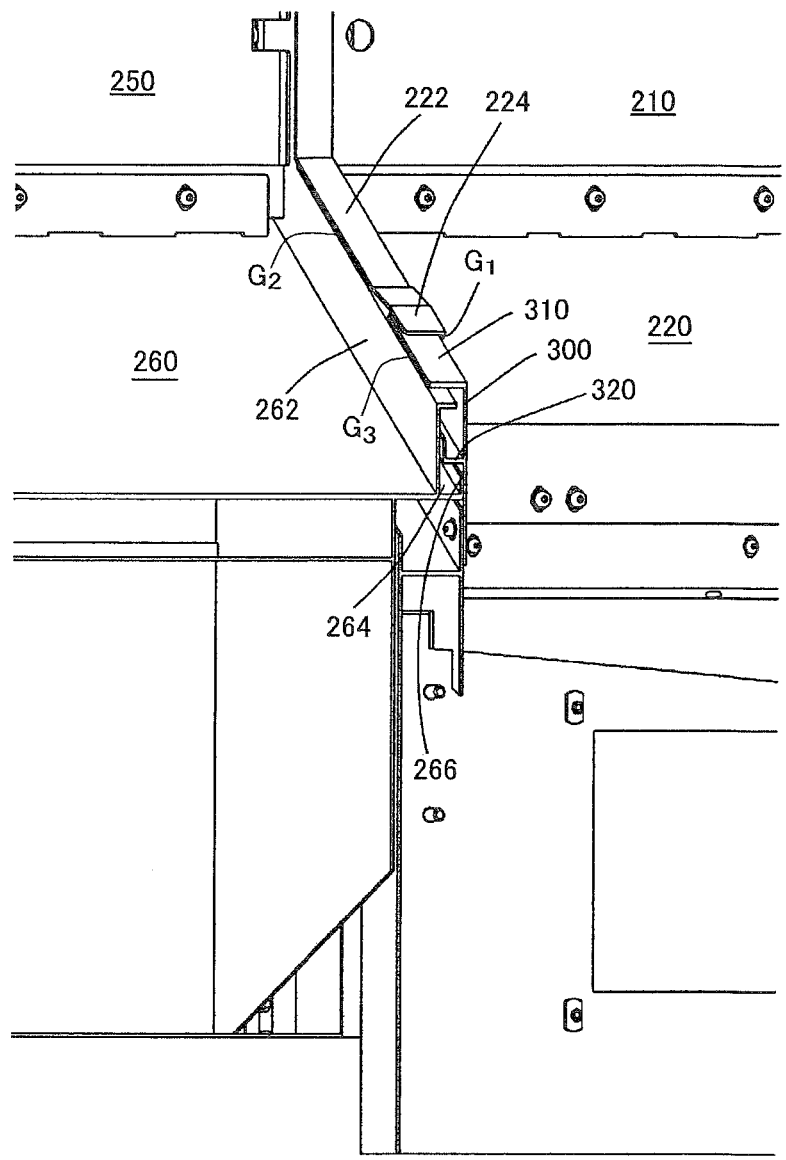
FIG. 19 is a perspective view of relationship between the two doors and the door meshing member including a cross-section taken along the line A-A shown in FIG. 12.

FIG. 17 is a perspective view illustrating a relationship between the coolant guiding plate 220 and the door meshing member 300 when the right door 250 is opened. FIG. 18 is a perspective view illustrating a relationship between the inner cover 260 and the door meshing member 300 when the left door 210 is opened. FIG. 19 is a perspective view illustrating a relationship between the coolant guiding plate 220, the inner cover 260, and the door meshing member 300 when the left door 210 and the right door 250 are closed, in which a cross-section taken along the line A-A shown in FIG. 12 is included.

As shown in FIGS. 17 and 19, the door meshing member 300 is formed of a metal plate. The door meshing member 300 includes an upper surface portion 310 and a gutter 320 disposed below the upper surface portion 310. The door meshing member 300 is mounted to the base 10 adjacent to the support 24 (see FIGS. 13 and 14).

When the left door 210 is closed, an engagement-front edge portion 224 of an engagement portion 222 of the coolant guiding plate 220 overlaps the upper surface portion 310 of the door meshing member 300. At the same time, a lower end of the gutter 226 on the coolant guiding plate 220 is located above an upper end portion of the gutter 320 in the door meshing member 300. As a result, the coolant flowing in the gutter 226 is collected in the chip disposal system 73 via the gutter 320 and the through-hole portion 15.

When the right door 250 is closed, the engagement portion 262 of the inner cover 260 overlaps the engagement portion 222 of the coolant guiding plate 220. At the same time, a front end 266 of a gutter 264 on the inner cover 260 abuts against the door meshing member 300. As a result, the gutter 264 of the right door 250 is located immediately under the gutter 320 in the door meshing member 300. Even if the coolant is leaked from the gutter 320, such a configuration reliably collects it via the gutter 264 on the inner cover 260.

A clearance $G_1$ is defined between one of side surfaces of the engagement front edge portion 224 and the door meshing member 300. A clearance $G_2$ is defined between the engagement portion 222 of the coolant guiding plate 220 and the engagement portion 262 of the inner cover 260. A clearance $G_3$ is defined between the engagement portion 262 of the inner cover 260 and the upper surface portion 310 of the door meshing member 300. Although these clearances are significantly narrow, the coolant leaks more or less when the coolant of high pressure directly hits these engaged portions.

The coolant leaked from the clearance $G_1$, the clearance $G_2$, and the clearance $G_3$ is collected in the chip disposal system 73 via the gutter 226 on the coolant guiding plate 220 and the gutter 320 in the door meshing member 300, or directly via the gutter 320 in the door meshing member 300, through the through-hole portion 15.

Part of the coolant not collected with the gutter 226 on the engagement coolant guiding plate 220 or the gutter 320 in the door meshing member 300, that is, the coolant overflowing from the gutters 226 and 320 is collected in the chip disposal system 73 via the gutter 264 on the inner cover 260 and the through-hole portion 15. The engagement portion 222, the front edge portion 224, and the gutter 226 of the coolant guiding plate 220, the engagement portion 262, the gutter 264, and the front end 266 of the inner cover 260, and the upper surface portion 310 and the gutter 320 of the door meshing member 300 constitute a labyrinth mechanism when the left door 210 and the right door 250 are closed.

When the left door 210 and the right door 250 are closed, even if the coolant of high pressure directly hits the inner surface of the door, this configuration eliminates or minimizes dropping of the coolant in the work area (recessed area) S.

The behavior of the coolant when one of the left door 210 and the right door 250 is opened will be described. When one of the doors is open, the coolant automatically stops. The coolant adhering to or remaining on portions of the doors during automatic operation of the machine behave as follows. The gutter 320 in the door meshing member 300, the coolant guiding plate 220 and the gutter 226 of the left door 210, and the inner cover 260 and the gutter 264 of the right door 250 will also be described.

The lower end of the gutter 320 in the door meshing member 300 extends beyond the rail engaged with the lower end of the inner cover 260 of the right door 250 and is located inside the base 10. The coolant adhering to or remaining on the gutter 320 drops to the inside of the base 10.

The lower end of the coolant guiding plate 220 of the left door 210 is engaged with the rail mounted to a mounting member on the base 10. The coolant adhering to or remaining on the coolant guiding plate 220 drops to the inside of the base 10.

The gutter 226 on the coolant guiding plate 220 of the left door 210 is located above the gutter 320 in the door meshing member 300 when the left door 210 is closed. The coolant adhering to or remaining on the gutter 226 passes through the gutter 320 and drops to the inside of the base 10. The lower end of the gutter 226 on the coolant guiding plate 220 extends into the machine by approximately the same dimension as the dimension of the coolant guiding plate 220 in plan view. As a result, the coolant dropping from the gutter 226 drops to the inside of the base 10 even when the left door 210 is half opened.

The lower end of the inner cover 260 of the right door 250 is engaged with the rail mounted to the rail-accepting metal plate 278, which is mounted to the front surface 17 of the recessed area of the base 10. The coolant adhering to or remaining on the inner cover 260 drops to the inside of the base 10.

The gutter 264 on the inner cover 260 of the right door 250 is disposed and extending from the upper end to the lower end of the inner cover 260. The coolant adhering to or remaining on the gutter 264 drops to the inside of the base 10.

Thus, the coolant is prevented from dropping in the work area (recessed area) S, and this keeps the work environment satisfactory.

Figure 20:
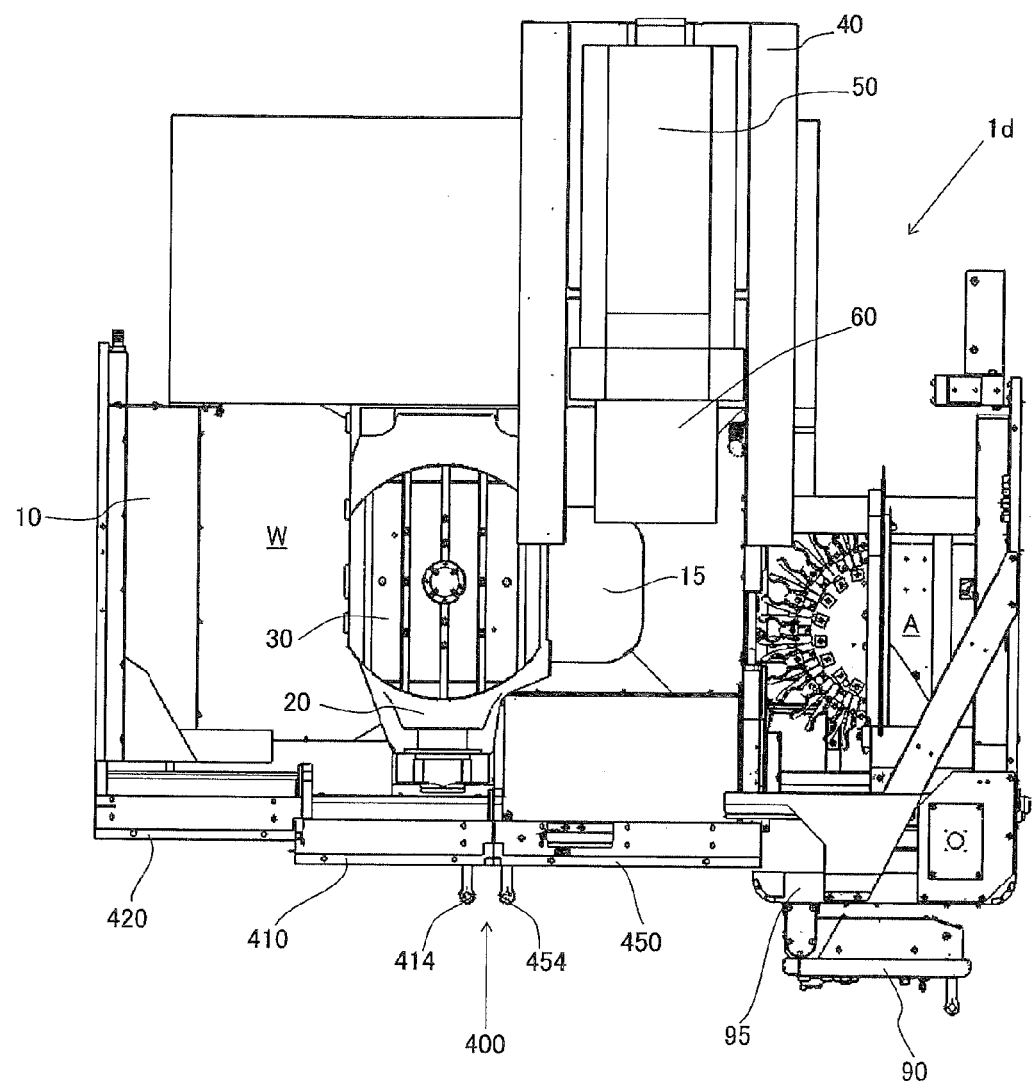
FIG. 20 is a plan view of a vertical machining center including three doors.

FIG. 20 is a plan view of a vertical machining center 1*d*, which includes three doors. A triple door 400 covers the front surface of the machine, and includes a right door 450, a first left door 410, and a second left door 420. The right door 450 is equipped to slide to the right with a handle 454 to be accommodated inside of the fixed cover 95, which is disposed on the front surface of the vertical machining center. The first left door 410 slides to the left with a handle 414. When a plate (not shown) mounted to the rear surface of the first left door 410 contacts the second left door 420, the two left doors 410 and 420 are overhung outwardly of the vertical machining center by a predetermined amount. This increases the width of the opening on the front surface of the vertical machining center.

In the embodiments described above, the recessed area disposed in the base 10 defines the work area. This enhances accessibility to the workpiece on the rotary table 30 and the tool spindle 70, and improves workability of loading and unloading of the workpiece, and checking of the machined surface, and other kinds of work. The recessed area is disposed inside of the machine. Thus, when the machining is completed, the blade of the tool may be checked and the chips adhering to the tool may be removed without moving the tool spindle in the Y axis direction, which has been back to its original position.

The recessed area has the distal end approximately on the extended line of the front end of the rotary table. This ensures that the chips and coolant adhering to the workpiece are collected in the chip disposal system 73 without dropping them in the work area (recessed area) S even when the B axis or C axis of the tilting rotary table is rotated in an attempt to have a close look at the machined surface.

The operation panel 90 is mounted to the end of the fixed cover 95 adjacent to the work area (recessed area) S, and the operation panel 90 is capable of turning and being fixed at any position. When the operation panel 90 is at a position parallel to the fixed cover 95, the operator can have the display device on the operation panel 90 and the transparent windows 110, 212, and 252 within the operator's field of view, enabling the operator to observe the status of the NC apparatus that is controlling the machine tool and the status of the inside of the vertical machining center during the machining at the same time. When the operation panel 90 is fixed at a position orthogonal to the fixed cover 95 and the operator works within the work area (recessed area) S, the operator can approach closer to the switches necessary for manual operation to easily operate these switches.

The inner cover with an inclined surface is disposed on the inner surface of the door between the door and the rail mounted to the front surface 17 of the recessed area of the base 10. The recessed area defines the work area (recessed area) S. The inner cover with the inclined surface ensures that the chips resulting from the machining and the coolant fed to improve cuttability are prevented from remaining on inner portions of the door or from dropping in the work area (recessed area) S, and that the chips and the coolant are collected quickly in the chip disposal system 73 via the through-hole portion 15. This, as a result, keeps the work environment clean. When the door is closed, the inner cover partitions the side surface of the base adjacent to the support from the machining area. This eliminates or minimizes contamination of the cloth of the operator when the operator is working in the work area (recessed area) S.

In the two doors configuration, only one of the doors is opened to check one side of the workpiece or the tool mounted to the tool spindle. Such a configuration ensures higher workability than a large single door opened over a large stroke. By opening both two doors to provide a wide opening, the workpiece can be brought in and out of the vertical machining center without difficulty. It is possible to select that which door(s) is to be opened depending on the kind of work.

The door meshing member is disposed to prevent the coolant from leaking out of the joint of the doors and dropping in the work area (recessed area) S even if the high pressure coolant directly hits the joint of the doors. It is noted that because the length of the inclined plate of the left door is different from the length of the inclined plate of the right door, the leakage of the coolant cannot be prevented simply by joining the two doors. The leakage of the coolant is prevented with the door meshing member having a labyrinth mechanism built between the two doors.

The recessed area may include a distal end approximately on an extended line of a front end of the rotary table.

The slide door may be configured to slide into a fixed cover disposed on the front surface of the vertical machining center, and an operation panel is mounted to an end of the fixed cover. The end of the fixed cover is adjacent to the recessed area. The operation panel may be configured to turn to be fixed at any position between positions parallel and orthogonal to the fixed cover.

The inner cover may have an upper end fixed to an inner surface of the slide door, and have a lower end engaged with a rail mounted to the base.

The slide door may include two slide doors.

The two slide doors may be configured to respectively open to a left and a right and meet at the end of the recessed area adjacent to the rotary table.

In the case where the slide door includes two slide doors, the inner cover is provided to one of the two slide doors.

A door meshing member may be disposed between the two slide doors. The door meshing member includes a labyrinth mechanism.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertical machining center comprising:
  a base;
  a tilting rotary table assembly disposed on the base at a front thereof and configured to turn and tilt a table face of a rotary table about a tilt axis;
  a tool spindle rotatable about a vertical axis line and movable in an X axis direction, which is a right-left direction of the vertical machining center, in a Y axis direction, which is a front-rear direction of the vertical machining center, and in a Z axis direction, which is a vertical direction, the X axis direction, the Y axis direction, and the Z axis direction being orthogonal to each other;
  a tilting shaft disposed in the tilting rotary table assembly, rotatable about the tilt axis, and oriented with the tilt axis extending in the Y axis direction;
  a recessed area of the base, recessed in the Y direction in a front surface of the vertical machining center, the recessed area being adjacent in the X direction to a support supporting the tilting shaft;
  a slide door arrangement configured to cover the front surface of the vertical machining center in a manner that is openable and closable; and
  an inner cover integral with a lower portion of the slide door arrangement and configured to extend above and cover the recessed area when the slide door arrangement is closed.

2. The vertical machining center according to claim 1, wherein the recessed area comprises a distal end approximately on an extended line of a front end of the rotary table.

3. The vertical machining center according to claim 2, wherein the slide door arrangement comprises a slide door that is configured to slide into a fixed cover disposed on the front surface of the vertical machining center, and an operation panel is mounted to an end of the fixed cover, the end of the fixed cover being adjacent to the recessed area, the operation panel being configured to turn relative to the fixed cover.

4. The vertical machining center according to claim 3, wherein the inner cover has an upper end fixed to an inner surface of the slide door, and has a lower end engaged with a rail mounted to the base.

5. The vertical machining center according to claim 4, wherein the slide door arrangement comprises an additional slide door.

6. The vertical machining center according to claim 3, wherein the slide door arrangement comprises an additional slide door.

7. The vertical machining center according to claim 2, wherein the inner cover has an upper end fixed to an inner surface of a slide door of the slide door arrangement, and has a lower end engaged with a rail mounted to the base.

8. The vertical machining center according to claim 7, wherein the slide door arrangement comprises an additional slide door.

9. The vertical machining center according to claim 2, wherein the slide door arrangement comprises two slide doors.

10. The vertical machining center according to claim 9, wherein the two slide doors are configured to respectively open to a left and a right with a part of an end of the recessed area adjacent to the rotary table being a center of opening.

11. The vertical machining center according to claim 1, wherein the slide door arrangement comprises a slide door that is configured to slide into a fixed cover disposed on the front surface of the vertical machining center, and an operation panel is mounted to an end of the fixed cover, the end of the fixed cover being adjacent to the recessed area, the operation panel being configured to turn relative to the fixed cover.

12. The vertical machining center according to claim 11, wherein the inner cover has an upper end fixed to an inner surface of the slide door, and has a lower end engaged with a rail mounted to the base.

13. The vertical machining center according to claim 12, wherein the slide door arrangement comprises an additional slide door.

14. The vertical machining center according to claim 11, wherein the slide door arrangement comprises an additional slide door.

15. The vertical machining center according to claim 1, wherein the inner cover has an upper end fixed to an inner surface of a slide door of the slide door arrangement, and has a lower end engaged with a rail mounted to the base.

16. The vertical machining center according to claim 15, wherein the slide door arrangement comprises an additional slide door.

17. The vertical machining center according to claim 1, wherein the slide door arrangement comprises two slide doors.

18. The vertical machining center according to claim 17, wherein the two slide doors are configured to respectively open to a left and a right with a part of an end of the recessed area adjacent to the rotary table being a center of opening.

19. The vertical machining center according to claim 18, wherein one slide door among the two slide doors comprises the inner cover on an inner surface of the one slide door.

20. The vertical machining center according to claim 19, further comprising a door meshing member disposed between the two slide doors, the door meshing member comprising a labyrinth mechanism.

21. The vertical machining center according to claim 1, further comprising:
a driving device for performing the tilting of the table face about the tilt axis.

22. The vertical machining center according to claim 21, wherein the driving device is disposed inside a hollow portion of the base.

* * * * *